(12) United States Patent
Luick

(10) Patent No.: US 7,769,987 B2
(45) Date of Patent: Aug. 3, 2010

(54) SINGLE HOT FORWARD INTERCONNECT SCHEME FOR DELAYED EXECUTION PIPELINES

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/769,104

(22) Filed: Jun. 27, 2007

(65) Prior Publication Data

US 2009/0006819 A1    Jan. 1, 2009

(51) Int. Cl.
G06F 9/38 (2006.01)
(52) U.S. Cl. ..................... 712/218
(58) Field of Classification Search ............ 712/218
See application file for complete search history.

(56) References Cited

U.S. PATENT DOCUMENTS

| | | | | |
|---|---|---|---|---|
| 5,572,690 | A * | 11/1996 | Molnar et al. ............. | 712/200 |
| 5,996,059 | A * | 11/1999 | Porten et al. ............. | 712/200 |
| 7,139,899 | B2 * | 11/2006 | Kerr et al. ............... | 712/218 |
| 7,490,221 | B2 * | 2/2009 | Evans et al. .............. | 712/34 |
| 7,584,449 | B2 * | 9/2009 | Beerel et al. ............. | 716/18 |
| 2004/0133767 | A1 * | 7/2004 | Chaudhry et al. .......... | 712/225 |
| 2004/0187119 | A1 * | 9/2004 | Janik et al. .............. | 718/100 |
| 2006/0004942 | A1 * | 1/2006 | Hetherington et al. ...... | 711/3 |
| 2006/0095732 | A1 * | 5/2006 | Tran et al. .............. | 712/217 |
| 2007/0022277 | A1 * | 1/2007 | Iwamura et al. ........... | 712/229 |

FOREIGN PATENT DOCUMENTS

| | | |
|---|---|---|
| EP | 1050808 A1 | 8/2000 |
| WO | WO99/14666 | 3/1999 |
| WO | WO2007141234 A1 | 12/2007 |

OTHER PUBLICATIONS

Chaudhry, S. etal., High Performance Throughput Computing, 2006, IEEE, pp. 32-45.*

* cited by examiner

Primary Examiner—Eric Coleman
(74) Attorney, Agent, or Firm—Patterson & Sheridan LLP

(57) ABSTRACT

A method and apparatus for forwarding data in a processor. The method includes providing at least one cascaded delayed execution pipeline unit having a first pipeline and a second pipeline, wherein the second pipeline executes instructions in a common issue group in a delayed manner relative to the first pipeline. The method further includes determining if a first instruction being executed in the first pipeline modifies data in a data register which is accessed by a second instruction being executed in the second pipeline. If the first instruction being executed in the first pipeline modifies data in the data register which is accessed by the second instruction being executed in the second pipeline, the modified data is forwarded from the first pipeline to the second pipeline.

25 Claims, 8 Drawing Sheets

SINGLE HOT FORWARD INTERCONNECT SCHEME FOR DELAYED EXECUTION PIPELINES

BACKGROUND OF THE INVENTION

1. Field of the Invention

The present invention generally relates to executing instructions in a processor.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system. Data being accessed and/or modified by instructions executed in the processor may also be stored in data registers in the processor. In some cases, each of the data registers in a processor may be grouped together in a bank of data registers, referred to as a register file.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time (in parallel).

Where multiple instructions are executing in parallel in a pipeline, a first instruction may modify register data which is utilized by a second instruction. For example, the first instruction may load data from a data cache into a target data register, thereby overwriting register data previously stored in the data register. The second instruction may subsequently read the modified data from the data register. The second instruction may then use the modified data, for example, to perform an arithmetic operation (e.g., an addition). In some cases, the second instruction may utilize data stored in multiple registers in the register file. For example, the second instruction may use data from two registers, one for each addend of an addition operation.

In some cases, where a first instruction modifies data in a target data register which is utilized by a second instruction, the data stored in the target data register may not immediately be updated with the modified data of the first instruction. Until the modified data is written to the target data register in the register file, the target data register may contain outdated data which was previously stored in the target data register. Because the target data register may not be immediately updated with the modified data of the first instruction, the second instruction may receive outdated data from the data register (e.g., if the second instruction attempts to access the data register contents before the data register has been updated with the modified data from the first instruction). In some cases, the outdated data may remain in the data register for several clock cycles while the modified data is maintained in the pipeline, in latches, and/or in a queue. Thus, even if the first instruction and second instruction are executed several cycles apart, the second instruction may not receive the modified data if the second instruction attempts to access the data stored in the data register.

Accordingly, what is needed is an improved method and apparatus for providing updated register data in a processor.

SUMMARY OF THE INVENTION

The present invention generally provides a method and apparatus for forwarding data in a processor. In one embodiment, the processor may have at least one cascaded delayed execution pipeline unit having a first pipeline and a second pipeline, wherein the second pipeline executes instructions in a common issue group in a delayed manner relative to the first pipeline. The method includes receiving an issue group of instructions, determining if a first instruction being executed in the first pipeline modifies data in a data register which is accessed by a second instruction being executed in the second pipeline. If the first instruction being executed in the first pipeline modifies data in the data register which is accessed by the second instruction being executed in the second pipeline, the modified data is forwarded from the first pipeline to the second pipeline.

Embodiments of the invention also provide a processor including at least one cascaded delayed execution pipeline unit having a first pipeline and a second pipeline, wherein the second pipeline is configured to execute instructions in a common issue group in a delayed manner relative to the first pipeline. The processor also includes circuitry configured to determine if a first instruction being executed in the first pipeline modifies data in a data register which is accessed by a second instruction being executed in the second pipeline. If the first instruction being executed in the first pipeline modifies data in the data register which is accessed by the second instruction being executed in the second pipeline, the modified data is forwarded from the first pipeline to the second pipeline.

Embodiments of the invention also provide a processor including at least one cascaded delayed execution pipeline unit having a first pipeline and a second pipeline, wherein the second pipeline is configured to execute instructions in a common issue group in a delayed manner relative to the first pipeline. The processor also includes a first forwarding path between the first pipeline and the second pipeline. The first forwarding path is configured to provide modified register data from the first pipeline to the second pipeline within one clock cycle of the register data being changed in the first pipeline.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a block diagram depicting the format of exemplary instructions executed by the processor according to one embodiment of the invention.

DETAILED DESCRIPTION OF THE PREFERRED EMBODIMENTS

The present invention generally provides a method and apparatus for forwarding data in a processor. In one embodiment, the method includes providing at least one cascaded delayed execution pipeline unit having a first pipeline and a second pipeline, wherein the second pipeline executes instructions in a common issue group in a delayed manner relative to the first pipeline. The method also includes determining if a first instruction being executed in the first pipeline modifies data in a data register which is accessed by a second instruction being executed in the second pipeline. If the first instruction being executed in the first pipeline modifies data in the data register which is accessed by the second instruction being executed in the second pipeline, the modified data is forwarded from the first pipeline to the second pipeline. In some cases, because of the delayed, cascaded design of the pipeline unit, the number of forwarding paths in a pipeline unit may be reduced with respect to other pipeline units which do not utilize cascaded, delayed execution.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Overview of an Exemplary System

Figure 1:
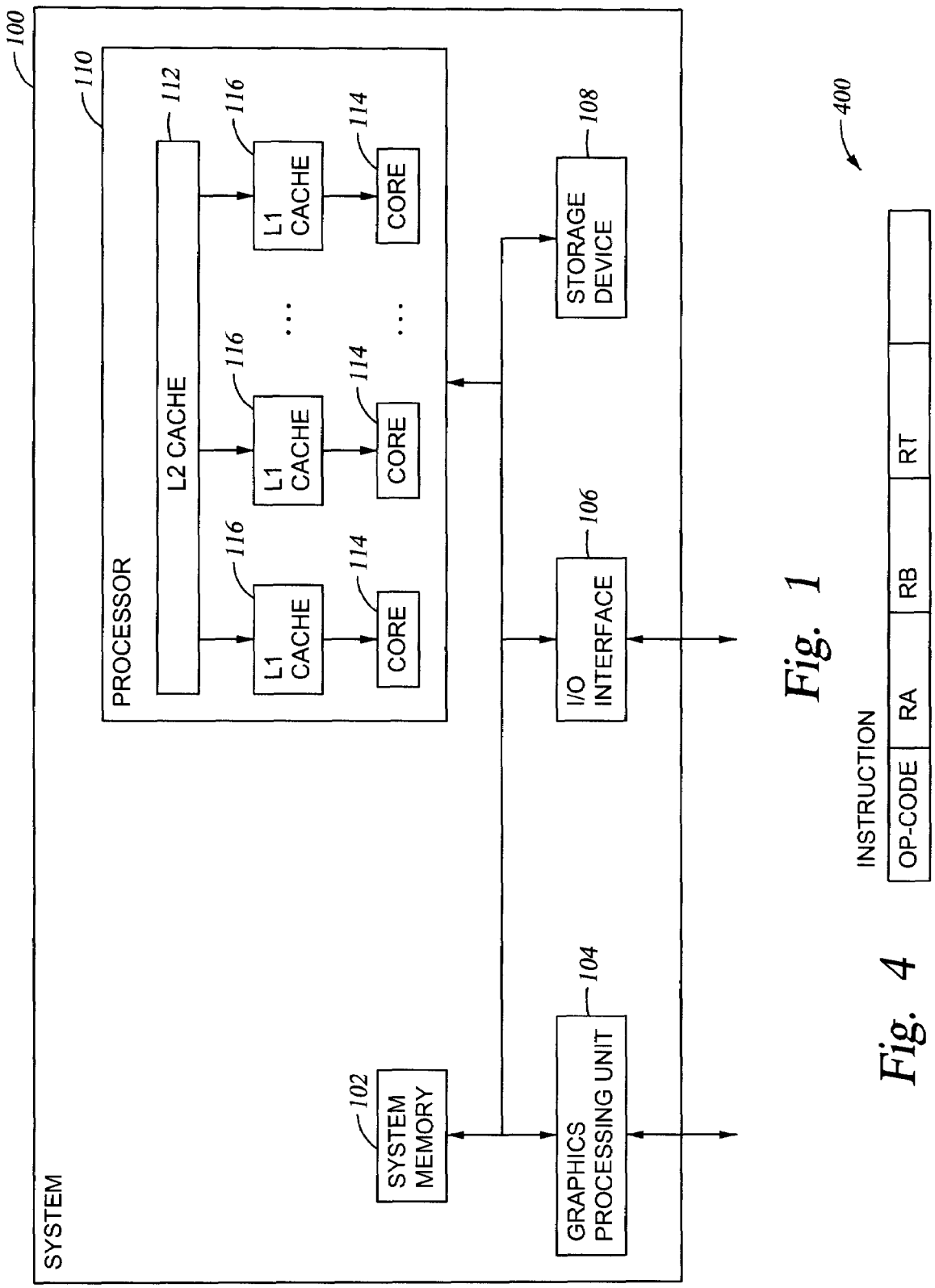
FIG. 1 is a block diagram depicting a system according to one embodiment of the invention.

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
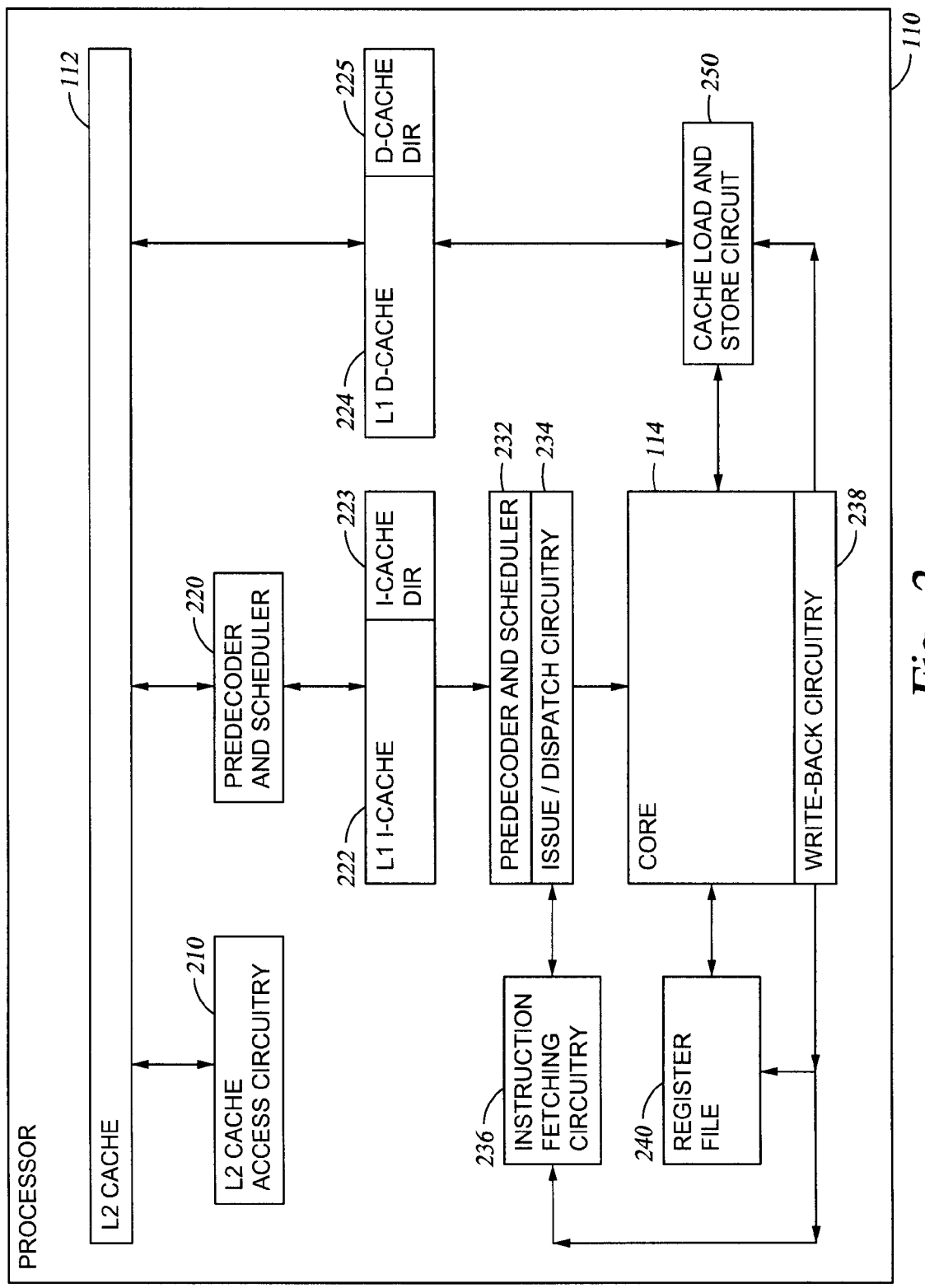
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220 (described below in greater detail).

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. In some cases, the predecoder and scheduler 220 may be shared among multiple cores 114 and L1 caches. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core. A branch unit within the core may be used to change the program counter when a branch instruction is encountered. An I-line buffer 232 may be used to store instructions fetched from the L1 I-cache 222. Issue and dispatch circuitry 234 may be used to group instructions retrieved from the I-line buffer 232 into instruction groups which may then be issued in parallel to the core 114 as described below. In some cases, the issue and dispatch circuitry may use information provided by the predecoder and scheduler 220 to form appropriate instruction groups.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file 240, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Figure 3:
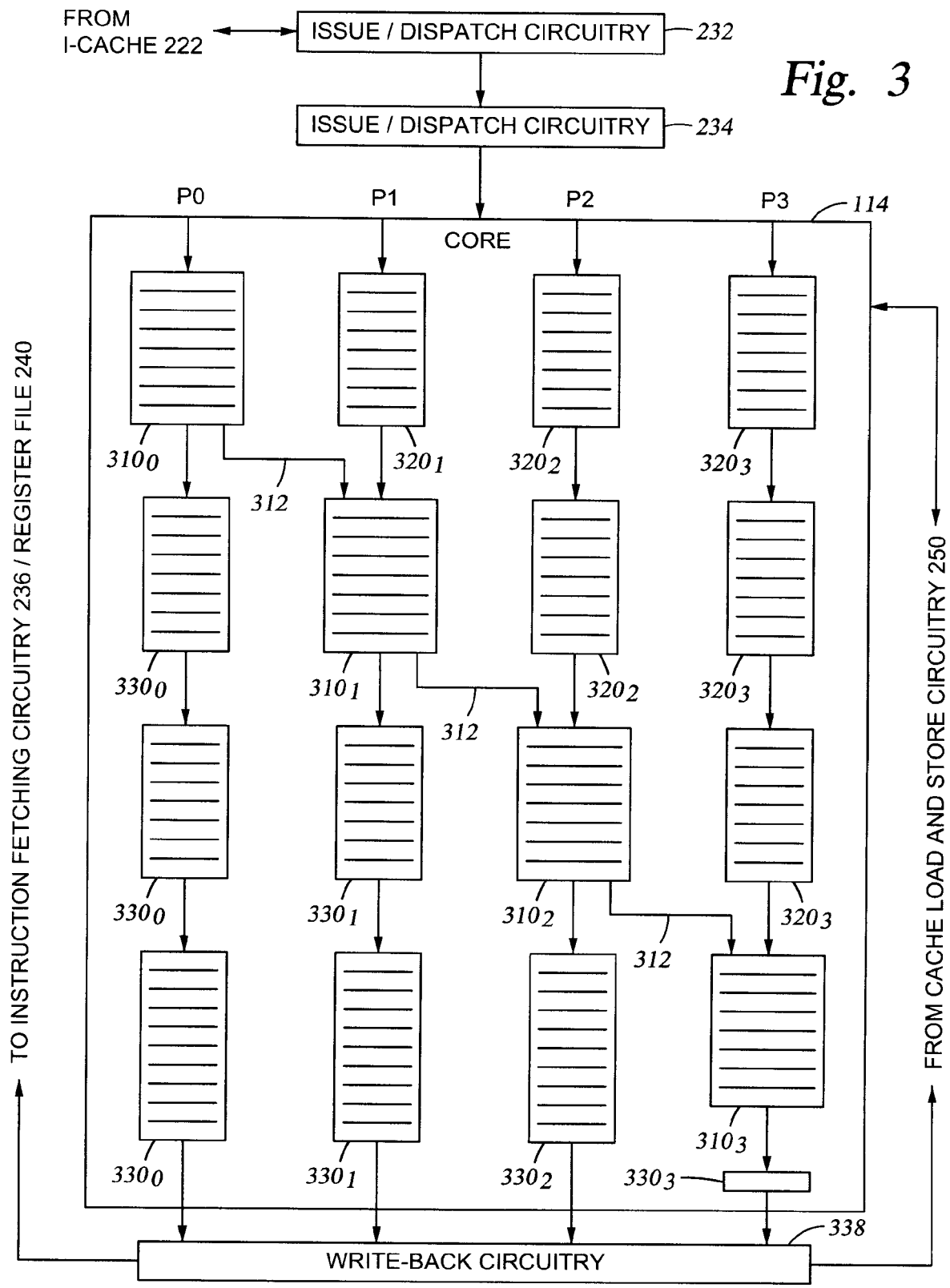
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit 310 may be shared with a predecoder and scheduler 220 which is shared among multiple cores 114 or, optionally, which is utilized by a single core 114. The execution unit 310 may also read data from a register file 240, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In one embodiment, upon issuing the issue group to the processor core 114, I0 may be executed immediately in execution unit $310_0$. Later, after instruction I0 has finished being executed in execution unit $310_0$, execution unit $310_1$ may begin executing instruction I1, and so one, such that the instructions issued in parallel to the core 114 are executed in a delayed manner with respect to each other. Also, in one embodiment, some execution units 310 may be delayed with respect to each other while other execution units 310 are not delayed with respect to each other.

In one embodiment, instructions which are not being executed by an execution unit 310 (e.g., instructions being delayed) may be held in a delay queue 320. The delay queues 320 may be used to hold instructions in an instruction group which have not been executed by an execution unit 310. For example, while instruction I0 is being executed in execution unit $310_0$, instructions I1, I2, and I3 may be held in a delay queue 320. Once the instructions have moved through the delay queues 320, the instructions may be issued to the appropriate execution unit 310 and executed. The target delay queues 330 may be used to hold the results of instructions which have already been executed by an execution unit 310. For example, an instruction executed in a first execution unit 310 for a given pipeline may modify register data. Before the modified register data is written back by the write-back circuitry 238, the register data may be stored in the target delay queue 330. In some cases, results in the target delay queues 330 may be forwarded to executions units 310 for processing or invalidated where appropriate.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 238 may be used to write back the most recently modified value of a register (received from one of the target delay queues 330) and discard invalidated results.

An Exemplary Instruction

FIG. 4 is a block diagram depicting the format of an exemplary instruction executed by the processor according to one embodiment of the invention. As depicted, a first instruction may contain an operation code (op-code) identifying the type of instruction, a first source register designation (Register A, or RA), a second source register designation (Register B, or RB), and a target register (RT). The op-code may, for example, identify an arithmetic operation to be performed with the contents of a first register identified by RA and a second register identified by RB. The result of the arithmetic operation may then be placed in a third register identified by RT. As known to those skilled in the art, instructions may also be provided in other formats which, for example, do not require a register designation, provide a single register designation (e.g., as a source or a target), provide two register designations (e.g., as a source and a target), or provide more than three register designations.

Providing Forwarding Paths in a Delayed Execution Pipeline

As described above, in one embodiment of the invention, the cascaded delayed execution pipeline unit may include at least a first pipeline and a second pipeline. When a common issue group of instructions are issued to the pipeline unit, the second pipeline may execute instructions in the common issue group in a delayed manner relative to the first pipeline. In some cases, a first instruction being executed in the first pipeline may modify data in a data register which is accessed by a second instruction being executed in the second pipeline. In order to provide the second instruction with the modified data quickly, for example, before the modified data has been written back to the register file 240 or to a target delay queue 330, the data may be forwarded from the first pipeline to the second pipeline. In some cases, the forwarded data may be received in the second pipeline one or two clock cycles after the data was modified by the first instruction in the first pipeline. Also, as described below, because of the delayed, cascaded design of the pipeline unit, the number of forwarding paths in a pipeline unit may be reduced with respect to other cores which do not utilize cascaded, delayed execution.

Figure 5A:
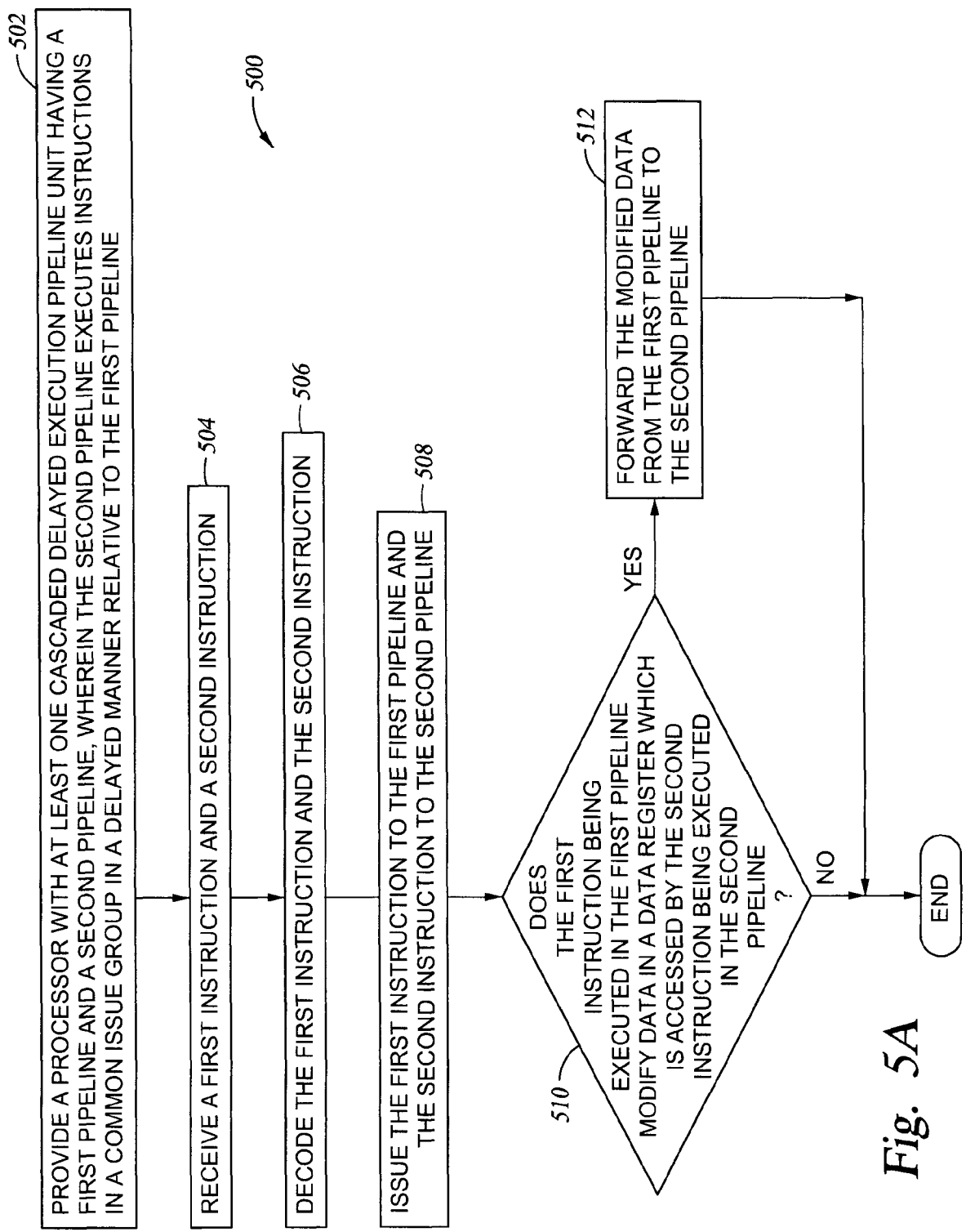
FIG. 5 is a flow diagram depicting a process for forwarding register data in a processor according to one embodiment of the invention.

FIG. 5A is a flow diagram depicting a process 500 for forwarding data in a delayed execution pipeline according to one embodiment of the invention. As depicted, the process 500 may begin at step 502 where a processor with at least one cascaded, delayed execution pipeline is provided. The cascaded, delayed execution pipeline may include a first pipeline and a second pipeline, and the second pipeline may be configured to execute instructions in a common issue group in a delayed manner relative to the first pipeline.

At step 504, a first instruction and second instruction may be received, for example, from the L2 cache 112. At step 506, the first instruction and the second instruction 506 may be decoded, for example, using the predecoder and scheduler 220. Then, at step 508, the first instruction may be issued to the first pipeline and the second instruction may be issued to the second pipeline (e.g., after being placed in the L1 I-cache 222 and issued by the issue and dispatch circuitry 234).

At step 510, a determination may be made of whether the first instruction modifies data in a data register which is also accessed by the second instruction. The determination may be made, for example, using circuitry which determines which location in the processor 110 contains the most recently updated version of the register data (e.g., the register file 240, a target delay queue 330, or one of the execution units 310 which may provide the data via a forwarding path). The circuitry may also utilize information derived during decoding (e.g., by the predecoder and scheduler 220), such as information about instruction dependencies, to determine whether to perform forwarding. If a determination is made that the first instruction modifies data in a data register which is also accessed by the second instruction, then the modified data may be forwarded from the first pipeline to the second pipeline at step 512. As described below, the data may be forwarded between the first and second pipeline via a forwarding path between the pipelines. Furthermore, in some cases, the forwarding may be performed without stalling execution of the second instruction (e.g., by inserting no-ops in the second pipeline before the second instruction).

As mentioned above, in some cases, register data for a given register may be available from multiple sources including the register file 240, a target delay queue 330, or from another pipeline via a forwarding path. Furthermore, embodiments of the invention may provide multiple types of forwarding paths. For example, in one embodiment of the invention, the processor 110 may provide hot forwards and warm forwards. Hot forwards may refer to forwards which provide modified register data from a given pipeline within one cycle of the register data being modified (e.g., if the register data is modified in cycle one, then the register data may be provided via a forwarding path to a pipeline in cycle two). Warm forwards may refer to forwards which provide modified register data from a given pipeline within two cycles of the register data being modified (e.g., if the register data is modified in cycle one, then the register data may be provided via a forwarding path to a pipeline in cycle three). Where modified register data is retrieved from another location such as a target delay queue 330 after three or more cycles, the forward may be referred to as a cold forward.

Figure 5B:
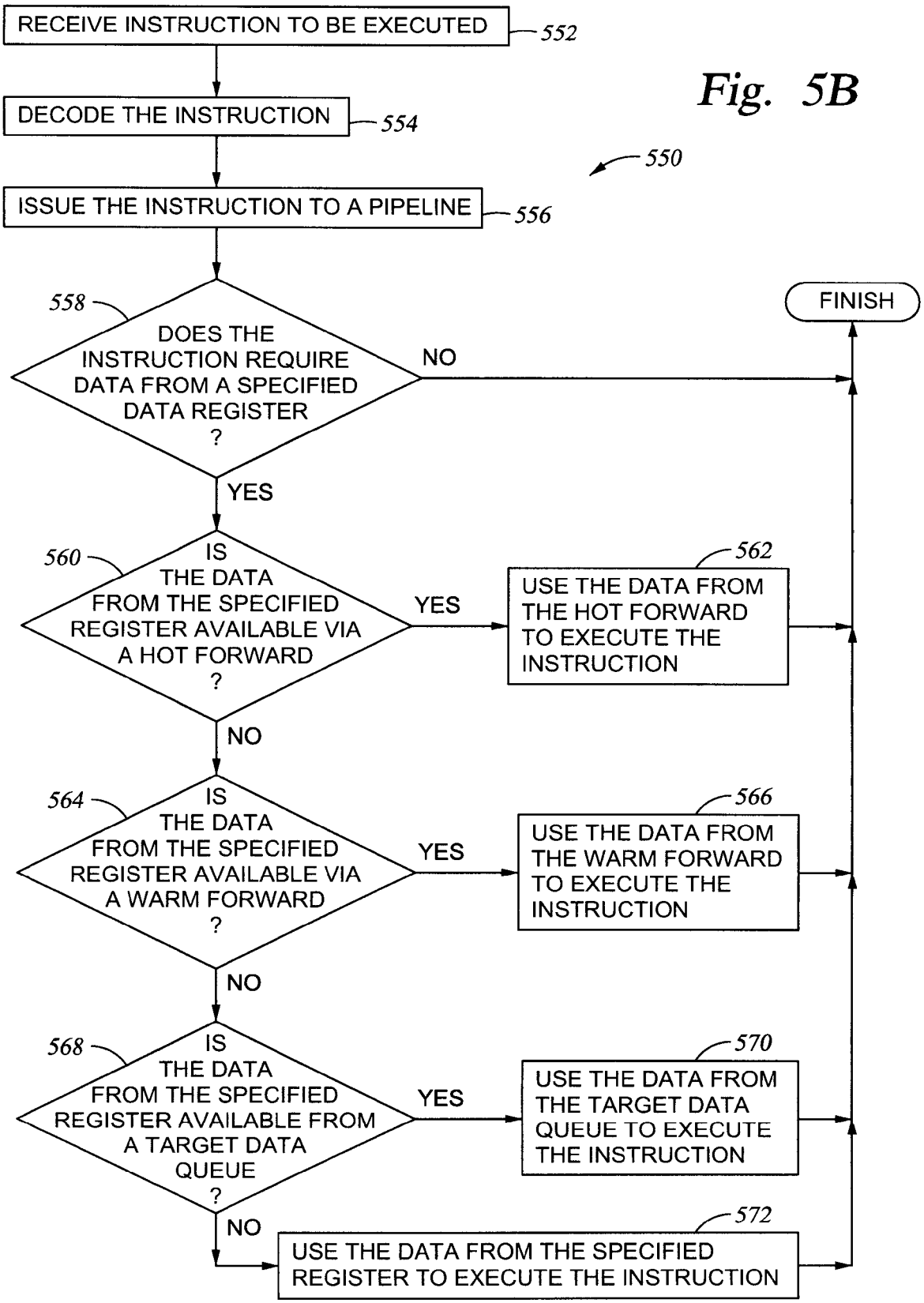

FIG. 5B is a flow diagram depicting a process 550 for determining which data to use for an instruction according to one embodiment of the invention. As depicted, the process may begin at step 552 where an instruction to be executed is received. At step 554 the instruction may be decoded and at step 556 the instruction may be issued to a pipeline for execution. At step 558, a determination may be made of whether the instruction requires data from a specified data register. If the instruction does not require data from a data register, there may not be a need to check for possible sources of register data, and the process 550 may finish.

If, however, data from a specified register is required by the instruction, then a determination may be made at step 560 of whether data for the instruction is available via a hot forward. If data for the instruction is available via a hot forward, then the data from the hot forward may be used to execute the instruction at step 562. If data for the instruction is not available via a hot forward, then a determination may be made at step 564 of whether the data from the specified register is available via a warm forward. If the data is available via a warm forward, then the data from the warm forward may be used to execute the instruction at step 566.

If the data for the instruction is not available via the hot forward or the warm forward, then a determination may be made at step 568 of whether the data from the specified register is available via a target delay queue 330 (e.g., a cold forward). If the data is available from the target delay queue 330, then the data from the target delay queue 330 may be used to execute the instruction at step 570. If, however, the data is not available from a target delay queue 330, then at step 572 data from the specified register may be used to execute the instruction.

Thus, as described above, the hot forward and warm forward paths may provide alternative paths in the processor 110 for moving data between pipelines 310. Also, in one embodiment, within three cycles of register data being modified, the register data may be placed in a target delay queue 330. Thus, in one embodiment, because execution in each pipeline execution unit 310 may be delayed with respect to each other pipeline execution unit 310 by at least one clock cycle for a common issue group, hot forward paths and warm forward paths may only be provided between a given pipeline execution unit 310 and itself or other pipeline execution units 310 which have a delay in execution of less than two cycles with respect to the source pipeline execution unit 310. Therefore, the number of forwarding paths in the processor 110 may be reduced, thereby valuable conserving space within the processor 110.

In one embodiment, to further limit the number of forwarding paths within a processor 110, the types of forwarding paths available for a given type of source register designation (e.g., the RA register designation and/or the RB register designation, as described above with respect to FIG. 4) may be limited. For example, in one embodiment, hot forwarding may only be provided for RA source register designations and not for RB source register designations, while warm forwarding may be provided for both RA and RB source register designations. Furthermore, in one embodiment, where hot forwarding is needed for an RB source register designation and not an RA source register designation, the RA and RB source register designations may be swapped, allowing the data for the designated RB source register to be forwarded within one clock cycle. Thus, in some cases, where RA and RB source register hot forwarding is not simultaneously required (which may, for example, be a rare occurrence), the number of forwarding paths may be reduced by only providing hot forwarding paths for a single type of source register designation.

In one embodiment, data for a specified register which is being forwarded may also be modified. For example, in one embodiment, data provided via a warm forward may be complemented (e.g., the bits of a number being forwarded may be inverted). Furthermore, in one embodiment, the complement may only be available for a single source register designation such as the RB source register designation. In some cases, by providing the complement for RB source register data via a warm forward, the complemented register data may be used for subtraction. For example, a subtraction instruction may take data from a source register identified by the RA designation and subtract data from a source register identified by the RB designation. By providing the complement of the designated RB source register data, the complemented data may be added to the designated RA source register data to subtract the designated RB data from the designated RA data.

Figure 6:
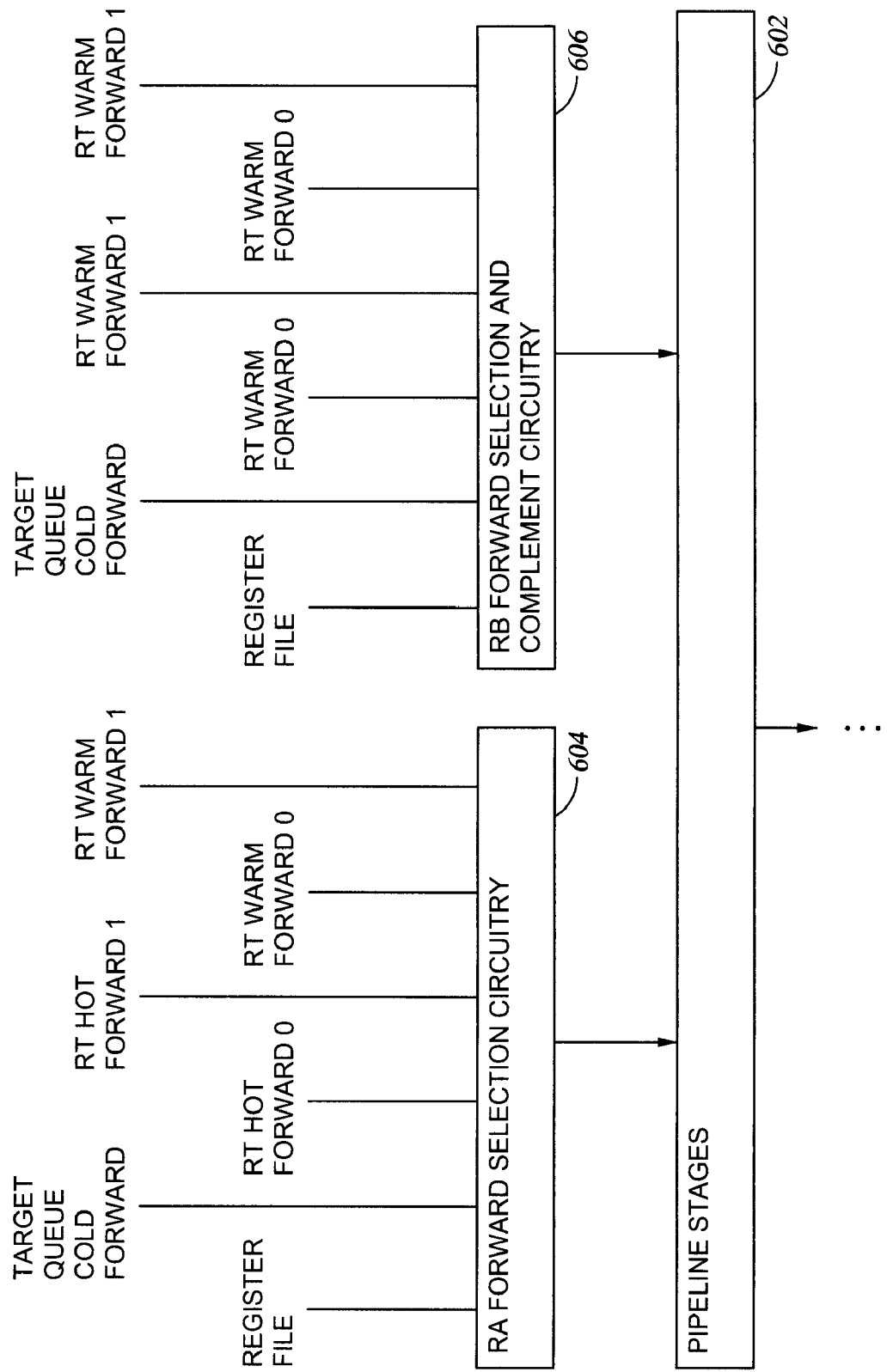
FIG. 6 is a block diagram depicting circuitry for selecting register data according to one embodiment of the invention.

FIG. 6 is a block diagram depicting circuitry for selecting register data according to one embodiment of the invention. As depicted, the circuitry may be configured to select forwarded data for an RA register designation (where provided) using RA forward selection circuitry 604 and for an RB register designation (where provided) using RB forward selection and complement circuitry 606. The selected register data may then be provided to one or more pipeline stages 602 which may use the selected register data to perform arithmetic operations, memory access operations, and/or other operations. As described above, in some cases, the depicted selection circuitry may use data from the predecoder and scheduler 220 to determine which data (e.g., from the register file 240, a target queue 330, or one of the forwarding paths) to use. For example, the predecoder and scheduler 220 may determine that a second instruction uses data from a first instruction, and provide predecoded bits indicating that register results for the first instruction should be forwarded to the second instruction.

As depicted, the RA forward selection circuitry 604 may be configured to select data from the register file 240, from a target queue 330, from one of a plurality of hot forwards, and from one of a plurality of warm forwards. In some cases, the hot forwards and warm forwards may provide data from the same pipeline stages 602 in the pipeline execution units 310 receiving the forwarded data or from other pipeline execution units 310. Similarly, the RA forward selection circuitry 606 may be configured to select data from the register file 240, from a target queue 330, and from one of a plurality of warm forwards. In some cases, the warm forwards may also provide data from the same pipeline stages 602 in the pipeline execution units 310 receiving the forwarded data or from other pipeline execution units 310. Also, as described above, in some cases, the register data designated by the RB source register designation may be complemented by the RB forward selection and complement circuitry 606.

Figure 7:
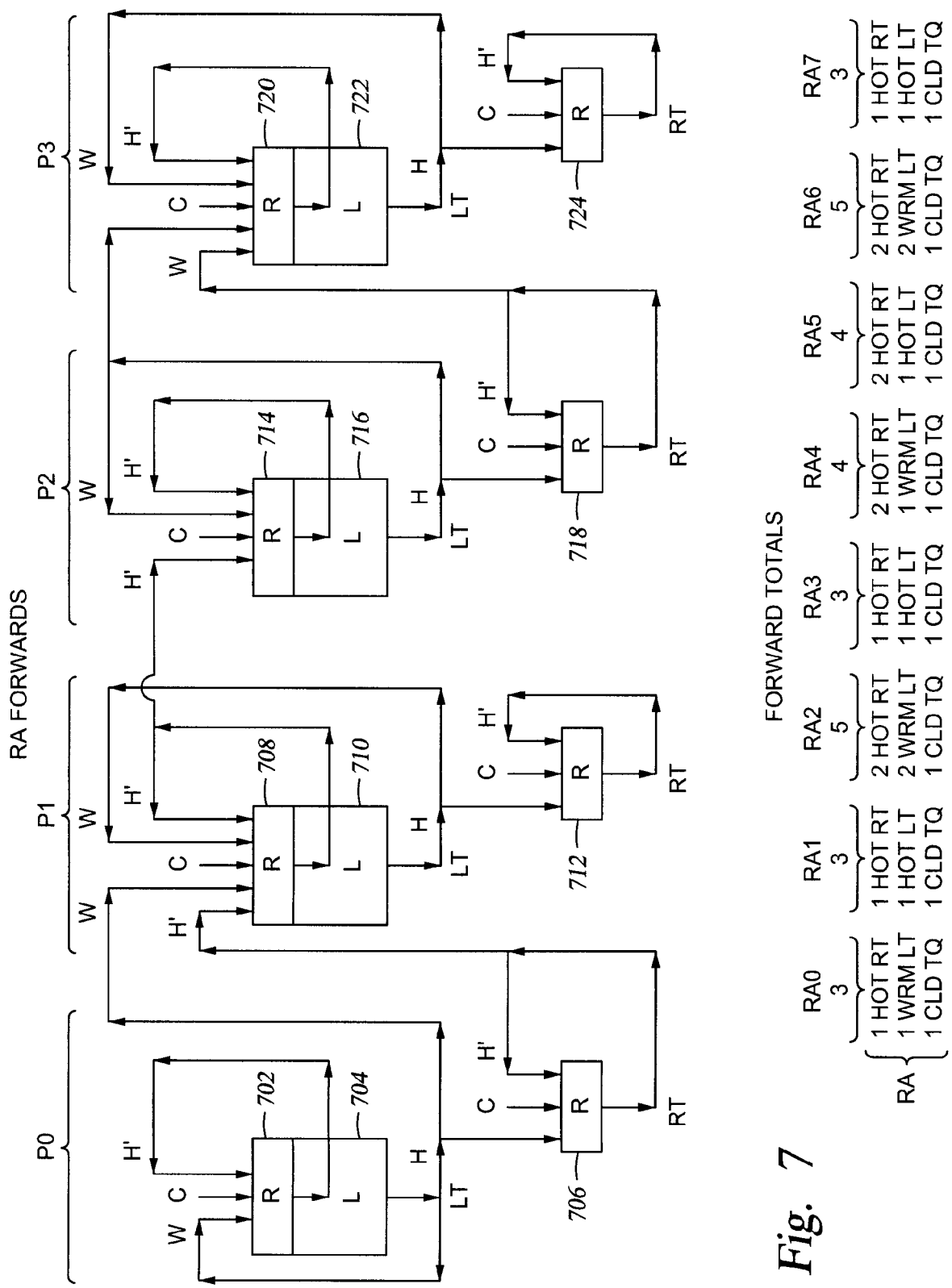
FIG. 7 is a block diagram depicting exemplary forwarding paths for a first source register designation according to one embodiment of the invention.

FIG. 7 is a block diagram depicting exemplary forwarding paths for an RA source register designation according to one embodiment of the invention. As depicted, each pipeline may include multiple pipeline stages including register access and arithmetic logic stages (designated by R) and load/store stages (designated by L). The R stages 702, 706, 708, 712, 714 718, 720, 724 may be used for loading data from and storing data to registers, as well as for performing arithmetic operations on the data being loaded and stored. The register data output from the R stages 702, 706, 708, 712, 714 718, 720, 724 may be referred to as a register target, or RT. The L stages 704, 710, 716, 722 may be used to load data from memory into registers and store data from registers into memory. Register data output from the L stages 704, 710, 716, 722 may be referred to as load targets, or LT. Also, as depicted, some R stages and L stages may be paired together (e.g., as depicted with respect to R stage 702 and L stage 704) to provide functionality such as retrieving register data and using the retrieved data to calculate an effective address and load data from the effective address.

As described above, a variety of different types of forwarding paths may be provided for RA source register designations. The forwarding paths may include hot forwards for RT results, and both warm and hot forwards for LT results. Each R stage may also be configured to receive data via a cold forward from a target delay queue 330. Furthermore, as depicted, the number and length of forwarding paths between different pipelines P0, P1, P2, and P3 may be reduced. For example, between each pipeline (e.g., pipelines P0 and P1), no more than two forwarding paths for a given source register designation may be provided (e.g., a single hot forward and a single warm forward). Also, as depicted, in some cases, hot and/or warm forwards may be provided between stages of a single pipeline (e.g., stages 702, 704, 706 of pipeline P0).

Figure 8:
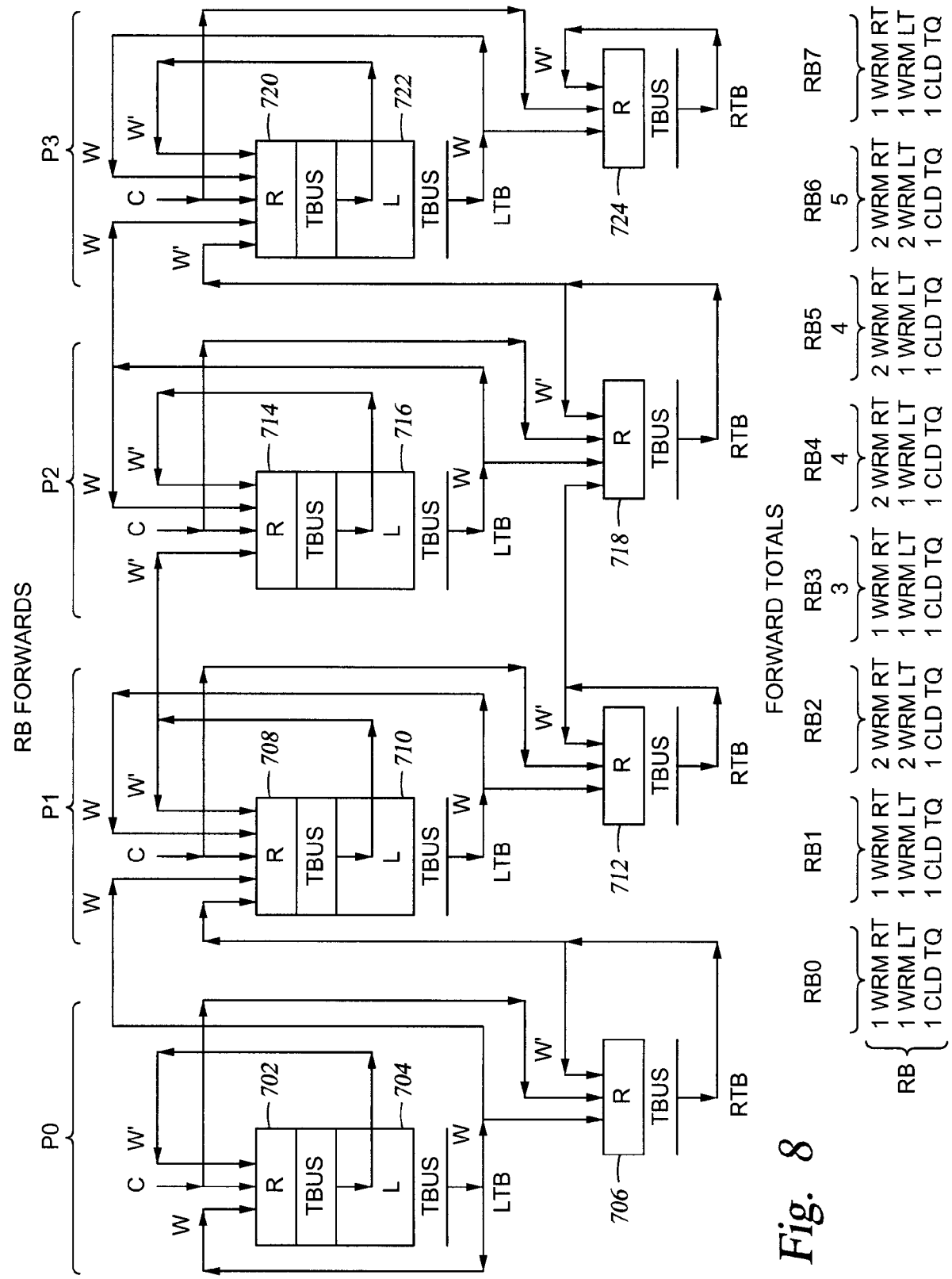
FIG. 8 is a block diagram depicting exemplary forwarding paths for a second source register designation according to one embodiment of the invention.

FIG. 8 is a block diagram depicting exemplary forwarding paths for the RB source register designation according to one embodiment of the invention. As described above, forwarding paths for the RB source register designation may be limited to warm forwards. As depicted, RB warm forwards may be provided for register results from R stages 702, 706, 708, 712, 714 718, 720, 724 as well as register results from L stages 704, 710, 716, 722. Furthermore, as depicted, in one embodiment, the number of forwarding paths between each different pipeline P0, P1, P2, and P3 may be limited to no more than two.

CONCLUSION

As described above, embodiments of the invention provide instructions with modified register data quickly, for example, before the modified data has been written back to a register file 240 or to a target delay queue 330 by forwarding the modified register data from a first pipeline to a second pipeline. In some cases, the forwarded data may be received in the second pipeline one or two clock cycles after the data was modified by the first instruction in the first pipeline. Also, as described above, because of the delayed, cascaded design of the pipeline unit, the number of forwarding paths in the pipeline unit may be reduced with respect to other pipeline units which do not utilize cascaded, delayed execution.

While the foregoing is directed to embodiments of the present invention, other and further embodiments of the invention may be devised without departing from the basic scope thereof, and the scope thereof is determined by the claims that follow.

What is claimed is:

1. A method of forwarding data in a processor, comprising:
providing at least one cascaded delayed execution pipeline unit having a first pipeline and a second pipeline, wherein the second pipeline is configured to begin execution of an instruction in a common issue group after beginning of execution of a corresponding instruction of the common issue group in the first pipeline;
determining if a first instruction being executed in the first pipeline modifies data in a data register which is accessed by a second instruction being executed in the second pipeline; and
if the first instruction being executed in the first pipeline modifies data in the data register which is accessed by the second instruction being executed in the second pipeline, forwarding the modified data from the first pipeline to the second pipeline.

2. The method of claim 1, wherein the modified data is received in the second pipeline one clock cycle after being modified in the first pipeline.

3. The method of claim 1, wherein the modified data is received in the second pipeline two clock cycles after being modified in the first pipeline.

4. The method of claim 1, wherein forwarding the modified data from the first pipeline to the second pipeline comprises:
selecting one of a first forwarding path which provides the modified data within one clock cycle of the data being modified and a second forwarding path which provides the modified data two clock cycles after the modified data is modified.

5. The method of claim 1, further comprising:
determining if a target delay queue contains modified data for the data register accessed by the second instruction in the second pipeline which is the most recently updated;
if the target delay queue contains modified data for the data register which is the most recently updated, forwarding data from the target delay queue to the second pipeline.

6. The method of claim 5, further comprising:
determining if a register file contains modified data for the data register accessed by the second instruction in the second pipeline which is the most recently updated;
if the register file contains modified data for the data register which is the most recently updated, providing data from the register file to the second pipeline.

7. The method of claim 1, wherein determining if a first instruction being executed in the first pipeline modifies data in a data register which is accessed by a second instruction being executed in the second pipeline comprises:
decoding the first instruction and the second instruction, comprising:
providing decoding bits indicating whether the modified data should be forwarded from the first pipeline to the second pipeline.

8. The method of claim 7, wherein decoding the first and the second instruction is performed after the first instruction and the second instruction are fetched from a level two cache and before the first instruction and the second instruction are placed in a level one cache.

9. The method of claim 1, wherein forwarding the modified data from the first pipeline to the second pipeline is performed without stalling execution of the second instruction.

10. A processor, comprising:
at least one cascaded delayed execution pipeline unit having a first pipeline and a second pipeline, wherein the second pipeline is configured to begin execution of an instruction of a common issue group after beginning of execution of a corresponding instruction of the common issue group in the first pipeline; and
circuitry configured to:
determine if a first instruction being executed in the first pipeline modifies data in a data register which is accessed by a second instruction being executed in the second pipeline; and
if the first instruction being executed in the first pipeline modifies data in the data register which is accessed by the second instruction being executed in the second pipeline, forward the modified data from the first pipeline to the second pipeline.

11. The processor of claim 10, wherein the modified data is received in the second pipeline one clock cycle after being modified in the first pipeline.

12. The processor of claim 10, wherein the modified data is received in the second pipeline two clock cycles after being modified in the first pipeline.

13. The processor of claim 10, wherein forwarding the modified data from the first pipeline to the second pipeline comprises selecting one of a first forwarding path which provides the modified data within one clock cycle of the data being modified and a second forwarding path which provides the modified data two clock cycles after the modified data is modified.

14. The processor of claim 10, wherein the circuitry is further configured to:
   determine if a target delay queue contains modified data for the data register accessed by the second instruction in the second pipeline which is the most recently updated;
   if the target delay queue contains modified data for the data register which is the most recently updated, forward data from the target delay queue to the second pipeline.

15. The processor of claim 14, wherein the circuitry is further configured to:
   determine if a register file contains modified data for the data register accessed by the second instruction in the second pipeline which is the most recently updated;
   if the register file contains modified data for the data register which is the most recently updated, provide data from the register file to the second pipeline.

16. The processor of claim 10, wherein determining if a first instruction being executed in the first pipeline modifies data in a data register which is accessed by a second instruction being executed in the second pipeline comprises:
   decoding the first instruction and the second instruction, comprising:
      providing decoding bits indicating whether the modified data should be forwarded from the first pipeline to the second pipeline.

17. The processor of claim 16, wherein decoding the first and the second instruction is performed after the first instruction and the second instruction are fetched from a level two cache and before the first instruction and the second instruction are placed in a level one cache.

18. The processor of claim 10, wherein forwarding the modified data from the first pipeline to the second pipeline is performed without stalling execution of the second instruction.

19. A processor comprising:
   at least one cascaded delayed execution pipeline unit having a first pipeline and a second pipeline, wherein the second pipeline is configured to begin execution of an instruction of a common issue group after beginning of execution of a corresponding instruction of the common issue group in the first pipeline; and
   a first forwarding path between the first pipeline and the second pipeline, wherein the first forwarding path is configured to provide modified register data from the first pipeline to the second pipeline within one clock cycle of the register data being changed in the first pipeline.

20. The processor of claim 19, further comprising:
   a second forwarding path between the first pipeline and the second pipeline, wherein the second forwarding path is configured to provide modified register data from the first pipeline to the second pipeline two clock cycles after the register data is changed in the first pipeline.

21. The processor of claim 19, wherein no more than two forwarding paths are provided between the first pipeline and the second pipeline.

22. The processor of claim 19, further comprising:
   a target delay queue, wherein the target delay queue is configured to provide modified register data to the second pipeline three clock cycles or more after the register data is changed in the first pipeline.

23. The processor of claim 19, further comprising:
   a register file, wherein the register file is configured to provide modified register data to the second pipeline if more recently modified data is not available via any forwarding path or any target delay queue.

24. The processor of claim 19, wherein forwarding paths in the processor for a first register operand are configured to provide first register data within one cycle of the first register data being modified, and wherein forwarding paths in the processor for a second register operand are configured to provide second register data only within two or more cycles of the second register data being modified.

25. The processor of claim 24, wherein the forwarding paths in the processor for the second register operand are configured to complement the second register data when the second register is forwarded.

* * * * *